US012358289B2

(12) United States Patent
Otana

(10) Patent No.: US 12,358,289 B2
(45) Date of Patent: Jul. 15, 2025

(54) INK JET RECORDING DEVICE

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 151 days.

(21) Appl. No.: 18/491,466

(22) Filed: Oct. 20, 2023

(65) Prior Publication Data

US 2024/0131849 A1 Apr. 25, 2024
US 2024/0227404 A9 Jul. 11, 2024

(30) Foreign Application Priority Data

Oct. 24, 2022 (JP) ................................. 2022-169658

(51) Int. Cl.

*B41J 2/17* (2006.01)
*B41J 2/165* (2006.01)
*B41J 29/17* (2006.01)

(52) U.S. Cl.

CPC ........... *B41J 2/1721* (2013.01); *B41J 2/1707* (2013.01); *B41J 2/1714* (2013.01); *B41J 29/17* (2013.01); *B41P 2235/27* (2013.01)

(58) Field of Classification Search

CPC ................. B41J 2/1721; B41J 2/16505; B41J 2/16523

See application file for complete search history.

(56) References Cited

FOREIGN PATENT DOCUMENTS

| | | | | |
|---|---|---|---|---|
| JP | 06-340092 A | | 12/1994 | |
| WO | WO-2006059791 A1 | * | 6/2006 | .......... B41J 2/16523 |
| WO | WO-2009107572 A1 | * | 9/2009 | ............ B41J 2/1721 |

* cited by examiner

*Primary Examiner* — Scott A Richmond
(74) *Attorney, Agent, or Firm* — Stein IP, LLC

(57) ABSTRACT

An ink jet recording device includes a record head, a waste ink container, and a suction mechanism that sucks gas from the waste ink container. The waste ink container includes a suction port connected to the suction mechanism, a first receiving port that receives ink, a porous absorbing member, and a first air duct formed as a space without the absorbing member, so as to connect the first receiving port and the suction port. The waste ink container further includes a blocking member having a lower gas permeability than the absorbing member, and the blocking member is disposed on a path from the first receiving port to the suction port via inside the absorbing member without passing through the first air duct.

7 Claims, 10 Drawing Sheets

INK JET RECORDING DEVICE

INCORPORATION BY REFERENCE

This application is based upon and claims the benefit of priority from the corresponding Japanese Patent Application No. 2022-169658 filed Oct. 24, 2022, the entire contents of which are hereby incorporated by reference.

BACKGROUND

The present disclosure relates to an ink jet recording device.

A conventional ink jet recording device is equipped with a waste ink container for storing ink to be discarded. Conventionally, a porous absorbing member for absorbing ink is disposed in the waste ink container.

SUMMARY

An ink jet recording device of the present disclosure includes a record head, a waste ink container, and a suction mechanism. The record head ejects ink so as to record images on a sheet. The waste ink container has a storage area inside, so as to store ink that is ejected from the record head but is not used for recording images. The suction mechanism sucks gas from the waste ink container. The waste ink container includes a suction port, a first receiving port, a porous absorbing member, and a first air duct. The suction port is connected to the suction mechanism. The first receiving port receives ink ejected from the record head. The absorbing member is disposed in the storage area so as to absorb ink. The first air duct is formed as a space without the absorbing member in the storage area, and connects the first receiving port and the suction port, so as to transmit suction airflow generated when the suction mechanism is driven. The waste ink container further includes a blocking member having a lower gas permeability than the absorbing member. The blocking member is disposed on a path from the first receiving port to the suction port via inside the absorbing member without passing through the first air duct.

DETAILED DESCRIPTION

Hereinafter, an ink jet recording device according to an embodiment of the present disclosure is described with an example of a printer, which records (prints) images on a sheet as a recording medium. As the sheet, a paper sheet is mainly used. Other sheets such as an OHP sheet may also be used.

<Structure of Printer>

Figure 1:
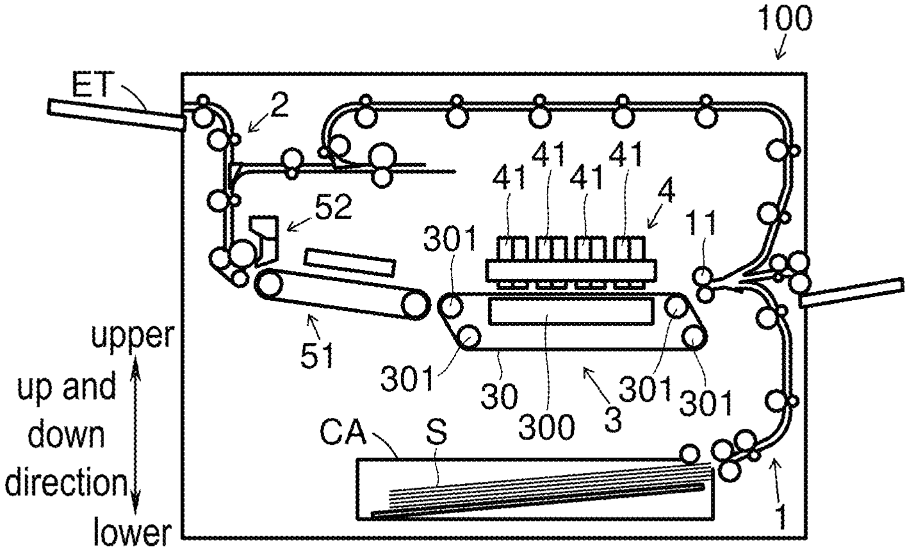
FIG. 1 is a schematic diagram of an ink jet recording device according to an embodiment.

As illustrated in FIG. 1, a printer 100 (corresponding to an "ink jet recording device") of this embodiment includes a first conveying section 1 and a second conveying section 2. The first conveying section 1 feeds a sheet S set in a sheet feed cassette CA, and conveys the same to a recording position. In a print job by the printer 100, images are recorded (printed) on the sheet S that passes the recording position. The second conveying section 2 conveys the printed sheet S. The second conveying section 2 discharges the recorded sheet S onto a discharge tray ET.

The first conveying section 1 is equipped with a plurality of conveying roller members including a registration roller pair 11. In FIG. 1, a numeral is assigned to only the registration roller pair 11 among the plurality of conveying roller members. Each of the plurality of conveying roller members rotates to convey the sheet S. The registration roller pair 11 has a pair of rollers that are pressed to contact each other. A registration nip is formed between the pair of rollers. The sheet S fed from the sheet feed cassette CA enters the registration nip. The registration roller pair 11 rotates so as to convey the sheet S that has entered the registration nip to a belt conveying section 3 described later.

When the front end of the sheet S reaches the registration nip, rotation of the registration roller pair 11 is stopped. On the other hand, the conveying roller member on the upstream side of the registration roller pair 11 in the conveying direction of the sheet S is rotating. Thus, a skew of the sheet S is corrected.

The printer 100 includes the belt conveying section 3. The belt conveying section 3 receives the sheet S from the first conveying section 1 and conveys the same. The belt conveying section 3 includes a conveyor belt 30. The conveyor belt 30 is endless and is supported so as to be capable of rotating. In addition, the belt conveying section 3 includes a plurality of stretching rollers 301. The plurality of stretching rollers 301 are supported to be capable of rotating. The conveyor belt 30 is stretched around the plurality of stretching rollers 301 and rotates. The sheet S conveyed from the first conveying section 1 reaches an outer periphery surface of the conveyor belt 30.

One of the plurality of stretching rollers 301 is linked to a belt motor (not shown), and a drive force of the belt motor is transmitted to the same to rotate. When the stretching roller 301 linked to the belt motor rotates, the conveyor belt 30 is driven to rotate. In this case, other stretching rollers 301 are also driven to rotate.

In addition, the belt conveying section 3 includes a suction unit 300. The suction unit 300 is disposed on an inner periphery side of the conveyor belt 30. The suction unit 300 sucks the sheet S on the outer periphery surface of the conveyor belt 30.

Specifically, the conveyor belt 30 has a plurality of suction holes (not shown). The suction holes of the conveyor belt 30 penetrate the conveyor belt 30 in the thickness direction. The suction unit 300 sucks the sheet S through the suction holes of the conveyor belt 30. In this way, the sheet S is sucked onto the outer periphery surface of the conveyor belt 30. The conveyor belt 30 rotates while sucking and holding the sheet S on the outer periphery surface. As a result, the sheet S is conveyed. In other words, the conveyor belt 30 sucks the sheet S on the outer periphery surface and conveys the same.

The printer 100 includes a recording unit 4. The recording unit 4 is disposed to face the outer periphery surface of the conveyor belt 30 in the up and down direction. During conveyance of the sheet S, the sheet S on the outer periphery surface of the conveyor belt 30 faces the recording unit 4 with a space in the up and down direction. In this way, during conveyance of the sheet S, the sheet S passes through a space between a nozzle surface of a record head 40 described later and the outer periphery surface of the conveyor belt 30. In other words, the space between the nozzle surface of the record head 40 and the outer periphery surface of the conveyor belt 30 is a part of a conveyance path of the sheet S.

Figure 2:
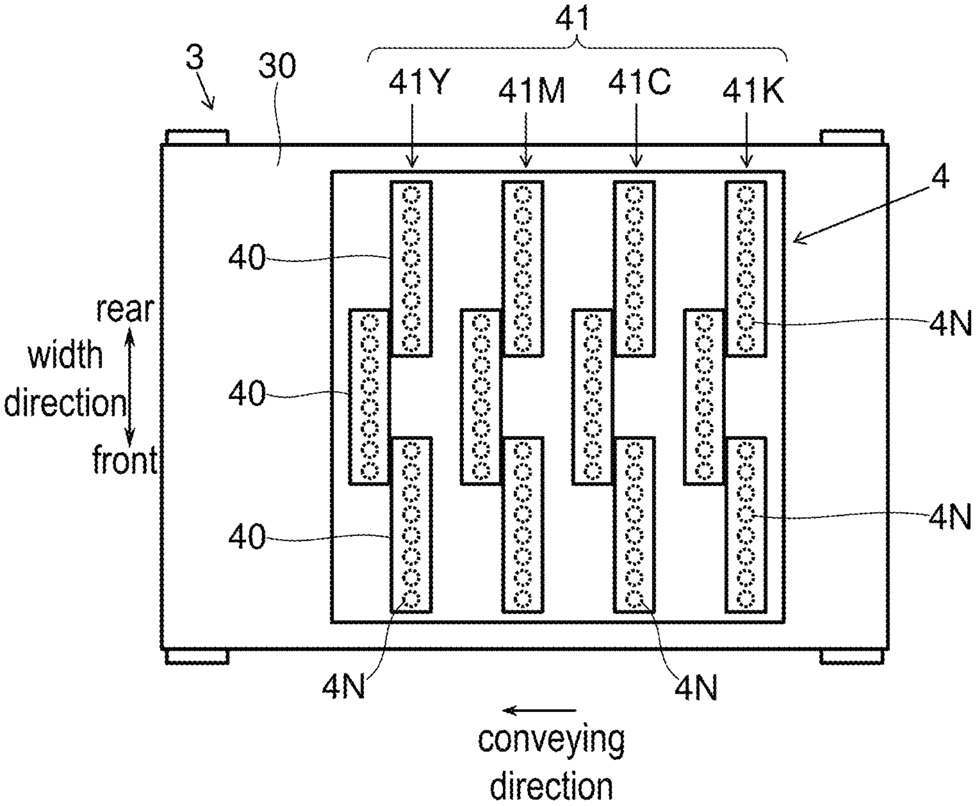
FIG. 2 is a plan view of a recording unit of the ink jet recording device according to the embodiment.

As illustrated in FIG. 2, the recording unit 4 includes four line heads 41 corresponding to cyan, magenta, yellow, and black colors, respectively. In FIG. 2, the cyan line head 41 is suffixed with "C", the magenta line head 41 is suffixed with "M", the yellow line head 41 is suffixed with "Y", and the black line head 41 is suffixed with "K", for discrimination. The same is true in FIG. 5 that will be referred to in the description later.

The line head 41 of each color includes a plurality of (for example, three) the record heads 40. For instance, the plurality of record heads 40 of each color are arranged in a zigzag manner in a direction perpendicular to the conveying direction of the sheet S by the conveyor belt 30. In the following description, the direction perpendicular to the conveying direction of the sheet S by the conveyor belt 30 is simply referred to as a width direction.

Each record head 40 is disposed with a distance to the outer periphery surface of the conveyor belt 30 in the up and down direction. In other words, each record head 40 is disposed at a position facing the sheet S conveyed by the conveyor belt 30 in the up and down direction. Further, in other words, the conveyor belt 30 sucks and conveys the sheet S below each record head 40. The up and down direction is the direction perpendicular to both the conveying direction and the width direction of the sheet S by the conveyor belt 30.

Each record head 40 has the nozzle surface, which is a surface facing the outer periphery surface of the conveyor belt 30 in the up and down direction. Each nozzle surface of the record head 40 has a plurality of nozzles 4N. The plurality of nozzles 4N of each record head 40 eject ink of the corresponding color in the downward direction. For instance, the record heads 40 have the same number of the nozzles 4N. The plurality of nozzles 4N of each record head 40 are arranged along the width direction of the conveyor belt 30. In FIG. 2, the nozzles 4N are shown in broken lines. In reality, more nozzles 4N are disposed in each record head 40. For convenience sake, only a part of the nozzles 4N are denoted by a symbol.

Each record head 40 ejects ink from the nozzles 4N to the sheet S on the outer periphery surface of the conveyor belt 30, on the basis of image data to be recorded on the sheet S in the print job. The ink ejected from each record head 40 is adhered to the sheet S. In this way, images are recorded on the sheet S. In other words, the recording position is between each record head 40 and the conveyor belt 30, and images are recorded on the sheet S at the recording position.

Here, among the plurality of nozzles 4N, the nozzle 4N whose number of times of ink ejection is small has remaining ink whose viscosity becomes high over time. As a result, clogging occurs and image quality is deteriorated. In order to suppress this problem, each record head 40 performs a flushing process. In the flushing process by each record head 40, the ink remaining in the nozzle 4N is ejected. In this way, the clogging is suppressed. The flushing process will be described later in detail.

With reference to FIG. 1 again, the printer 100 includes a drying unit 51 and a decurler 52. The drying unit 51 dries the ink adhered to the sheet S while conveying the sheet S to the decurler 52. The decurler 52 corrects a curl of the sheet S. The decurler 52 conveys the sheet S after correcting the curl to the second conveying section 2.

Figure 3:
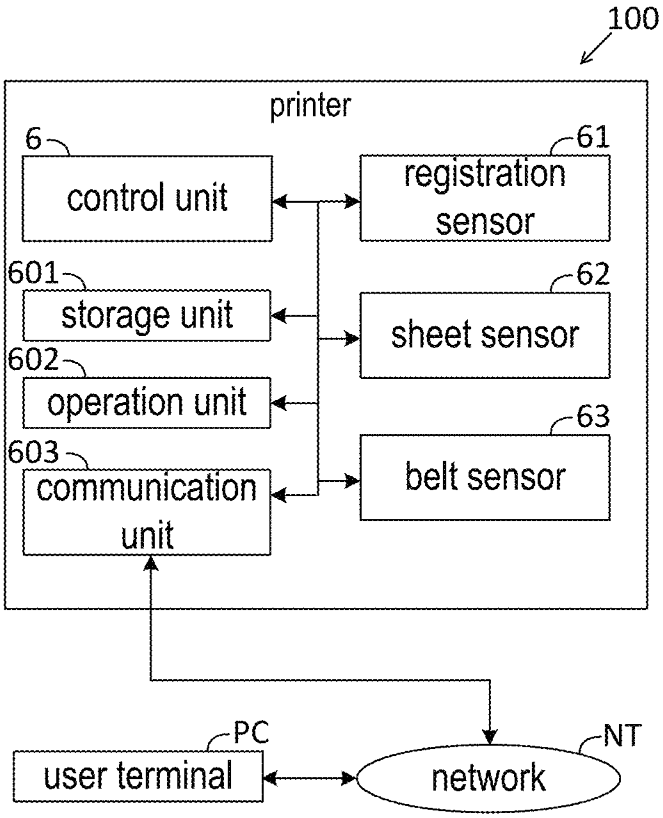
FIG. 3 is a block diagram of the ink jet recording device according to the embodiment.

In addition, as illustrated in FIG. 3, the printer 100 includes a control unit 6. The control unit 6 includes a processing circuit such as a CPU and an ASIC. The control unit 6 controls the print job. In other words, the control unit 6 controls operations of the first conveying section 1, the second conveying section 2, the belt conveying section 3, the recording unit 4, the drying unit 51, and the decurler 52. Further in other words, the control unit 6 controls conveyance of the sheet S and ink ejection of each record head 40. In addition, the control unit 6 controls the flushing process by each record head 40.

The control unit 6 is connected to a registration sensor 61, a sheet sensor 62, and a belt sensor 63. The control unit 6 controls conveyance of the sheet S and image recording on the sheet S, on the basis of outputs of the registration sensor 61, the sheet sensor 62, and the belt sensor 63.

The registration sensor 61 has a detection position that is a position on the upstream side of the registration nip in the conveying direction of the sheet S. The registration sensor 61 is a reflection type or a transmission type optical sensor, for example. The registration sensor 61 changes its output value according to presence or absence of the sheet S at the corresponding detection position.

The control unit 6 detects arrival of the front end and passing of the rear end of the sheet S at the detection position of the registration sensor 61, on the basis of the output value of the registration sensor 61. In other words, the control unit 6 detects arrival of the front end and passing of the rear end of the sheet S at the registration nip, on the basis of the output value of the registration sensor 61. The control unit 6 measures start timing of the conveyance of the sheet S by the registration roller pair 11 (rotation start timing of the registration roller pair 11), on the basis of elapsed time from detection of arrival of the front end of the sheet S at the detection position of the registration sensor 61.

The sheet sensor 62 has a detection position that is a position between the registration nip and the recording position of the line head 41 at the most upstream side in the conveying direction of the sheet S, among the plurality of line heads 41. The sheet sensor 62 changes its output value according to presence or absence of the sheet S at the corresponding detection position. As the sheet sensor 62, it may be possible to use a contact image sensor (CIS). Alternatively, as the sheet sensor 62, it may be possible to use a reflection type or transmission type optical sensor. For instance, the CIS may be used as the sheet sensor 62.

The control unit 6 detects arrival of the front end and passing of the rear end of the sheet S at the detection position of the sheet sensor 62, on the basis of the output value of the sheet sensor 62. The control unit 6 measures ink ejection timing to the sheet S conveyed by the conveyor belt 30, on the basis of the output value of the sheet sensor 62. Note that it may be possible to measure the ink ejection timing to the sheet S conveyed by the conveyor belt 30, on the basis of elapsed time from start of the conveyance of the sheet S by the registration roller pair 11.

In addition, the control unit 6 measures paper passing time, which is a period of time after the front end of the sheet S reaches the detection position of the sheet sensor 62 until the rear end of the same sheet S passes the detection position of the sheet sensor 62. The paper passing time at the detection position of the sheet sensor 62 varies depending on a size of the sheet S in the conveying direction. Therefore, the control unit 6 recognizes the size of the sheet S conveyed by the conveyor belt 30 in the conveying direction, on the basis of the paper passing time. In this way, even if the sheet S conveyed by the conveyor belt 30 has a non-regular size, the control unit 6 can recognize the size of the sheet S in the conveying direction.

The belt sensor 63 is a sensor for detecting a predetermined reference position (home position) of the conveyor belt 30. For instance, a predetermined mark is formed at the reference position of the conveyor belt 30. In this way, the reference position of the conveyor belt 30 can be detected based on the output value of the belt sensor 63. As the belt sensor 63, it may be possible to use the CIS. Alternatively, as the belt sensor 63, it may be possible to use a transmission type or reflection type optical sensor.

The control unit 6 detects the reference position of the conveyor belt 30 based on the output value of the belt sensor 63. In other words, on the basis of the output value of the belt sensor 63, the control unit 6 detects a position of a flushing area 31 (flushing holes 30*a*) described later.

In addition, the printer 100 includes a storage unit 601. The storage unit 601 includes a storage device such as a ROM and a RAM. The storage unit 601 is connected to the control unit 6. The control unit 6 reads information from the storage unit 601. In addition, the control unit 6 writes information into the storage unit 601.

The printer 100 includes an operation unit 602. The operation unit 602 includes a touch screen, for example. The touch screen displays software buttons and messages, so as to receive a touch operation by a user. In addition, the operation unit also includes hardware buttons to receive settings and instructions. The operation unit 602 is connected to the control unit 6. The control unit 6 controls display operation of the operation unit 602 (the touch screen). In addition, the control unit 6 detects operations made on the operation unit 602.

The printer 100 includes a communication unit 603. The communication unit 603 includes a communication circuit and the like. The communication unit 603 is connected to a user terminal PC via a network NT. The user terminal PC is an information processing device such as a personal computer. The control unit 6 communicates with the user terminal PC via the communication unit 603. For instance, the user terminal PC sends to the printer 100 print data (such as PDL data) including the image data to be recorded on the sheet S in the print job. In other words, a request to execute the print job is sent from the user terminal PC to the printer 100. The print data of the print job includes various setting data for printing, such as a size of the sheet S to be used in the print job.

<Outline of Flushing Process>

Figure 4:
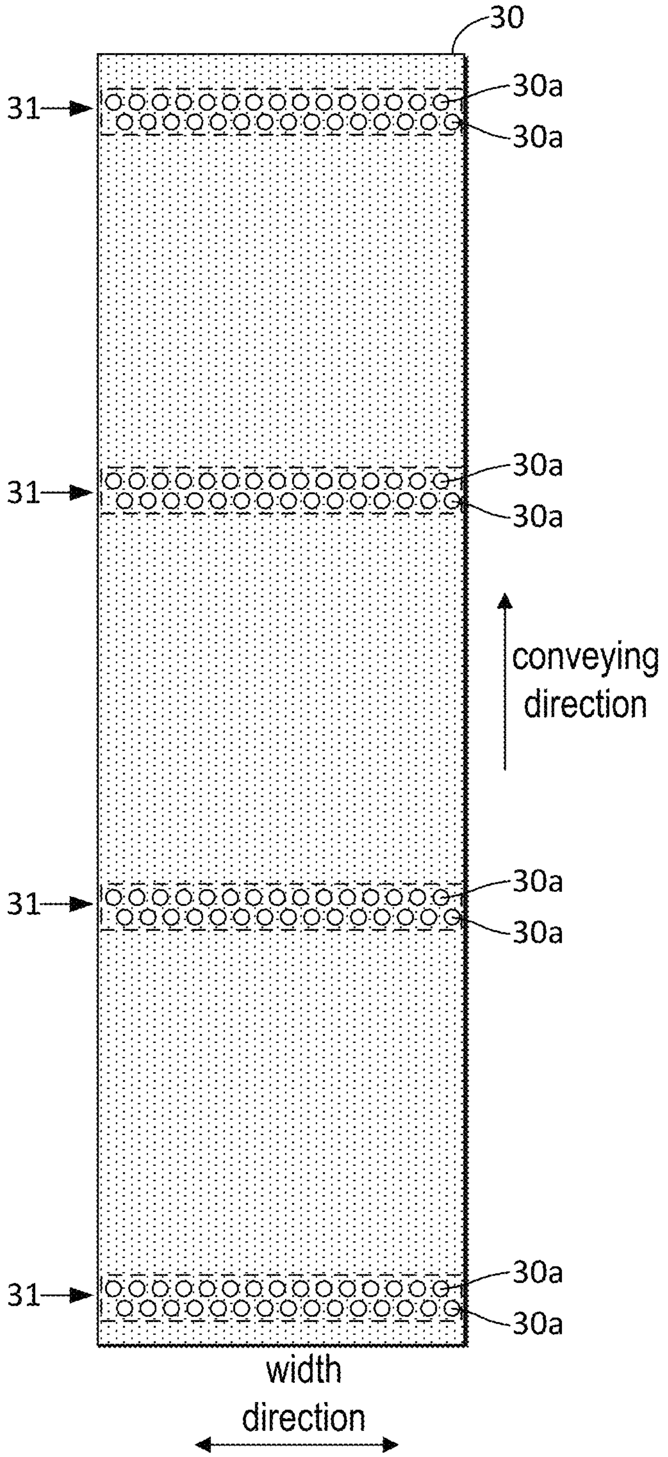
FIG. 4 is a plan view of a conveyor belt of the ink jet recording device according to the embodiment.

As illustrated in FIG. 4, the conveyor belt 30 includes flushing areas 31. In FIG. 4, the flushing area 31 is enclosed by a broken line. The flushing area 31 is an area including the flushing holes 30*a*, which are through holes penetrating the conveyor belt 30 in the thickness direction. The conveyor belt 30 is provided with a plurality of the flushing areas 31. The plurality of flushing areas 31 are arranged at a predetermined interval in the rotation direction of the conveyor belt 30 (the conveying direction of the sheet S).

Each flushing area 31 has a plurality of the flushing holes 30*a*. An aperture shape of the flushing hole 30*a* (a shape viewed from the thickness direction of the conveyor belt 30) is not limited particularly. The flushing hole 30*a* may have a circular shape, an elliptical shape, an oval shape, or a rectangular shape. Each of the plurality of nozzles 4N faces one of the flushing holes 30*a* in the up and down direction when the conveyor belt 30 rotates.

As the flushing process, the nozzles 4N of each record head 40 eject ink. When the flushing process is performed, each nozzle 4N ejects ink at timing when it faces the flushing hole 30*a* in the up and down direction. Then, the ink passes through the flushing hole 30*a*. In this way, when the flushing process is performed, the conveyor belt 30 is not stained by ink. In the following description, the ink ejected from each nozzle 4N when the flushing process is performed is referred to as flushing ink, which is discriminated from the ink that contributes to image recording on the sheet S. The ink that does not contribute to image recording on the sheet S is the flushing ink.

During execution of the print job, the control unit 6 controls the flushing process. Specifically, the control unit 6 measures start timing of the conveyance of the sheet S from the registration roller pair 11 to the conveyor belt 30, so that the flushing area 31 appears at a constant period between sheets (between the rear end of the preceding sheet S and the front end of the next sheet S). Then, the control unit 6 controls each nozzle 4N to eject ink at timing when it faces the flushing hole 30*a* without the sheet S overlapping in the up and down direction. In other words, the control unit 6 controls each nozzle 4N to eject ink at timing different from image recording timing on the sheet S.

<Storage of Flushing Ink>

The flushing ink is stored in a main body of the printer 100 (hereinafter, simply referred to as a device main body). Further, when the storage amount of the flushing ink reaches a predetermined amount, the flushing ink is discarded.

Specifically, as illustrated in FIGS. 5 to 9, the printer 100 includes a waste ink container 7 and a suction mechanism 10 connected to the waste ink container 7. The suction mechanism 10 sucks gas from the waste ink container 7, and ink mist in the waste ink container 7 hardly go out of the waste ink container 7. In addition, in the flushing process, the flushing ink passes through the flushing holes 30*a* of the conveyor belt 30, and the flushing ink is sucked by the function of the suction mechanism 10 so as to reach the waste ink container 7. The waste ink container 7 has a storage area inside. The waste ink container 7 stores the flushing ink in the storage area.

A plurality of the waste ink containers 7 are disposed. The waste ink containers 7 are assigned to the line heads 41, one by one. In other words, the waste ink containers 7 are assigned to cyan, magenta, yellow, and black colors, one by one.

The waste ink containers 7 are disposed on the inner periphery side of the conveyor belt 30 in the device main body. In the state of the waste ink container 7 mounted in the device main body, it is disposed below the record head 40 that ejects ink of the corresponding color. Each waste ink container 7 is disposed to face the nozzle surface of the corresponding record head 40 via the conveyor belt 30. In this way, when the flushing process is performed, the flushing ink passes through the flushing holes 30*a* and is stored in the storage area of each waste ink container 7.

Each waste ink container 7 is mounted to the device main body in an attachable and detachable manner. Each waste ink container 7 can be detached from the device main body by pulling it frontward (frontward in the width direction) from the device front side of the printer 100 (from the front in the width direction). When the storage amount of the flushing ink reaches a predetermined amount in one of the waste ink containers 7, the waste ink container 7 is removed from the device main body and is replaced.

Figure 5:
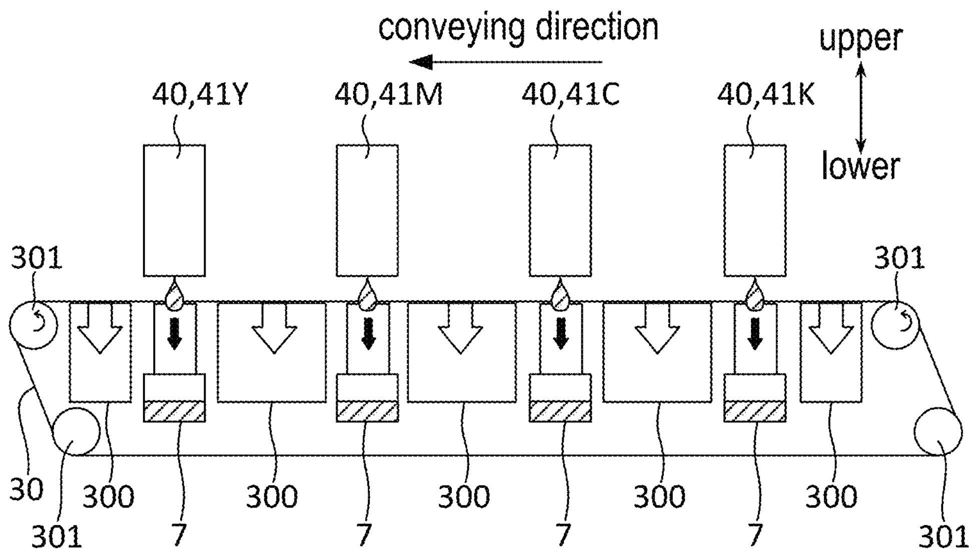
FIG. 5 is a schematic diagram of the conveyor belt and its vicinity of the ink jet recording device according to the embodiment.
Figure 6:
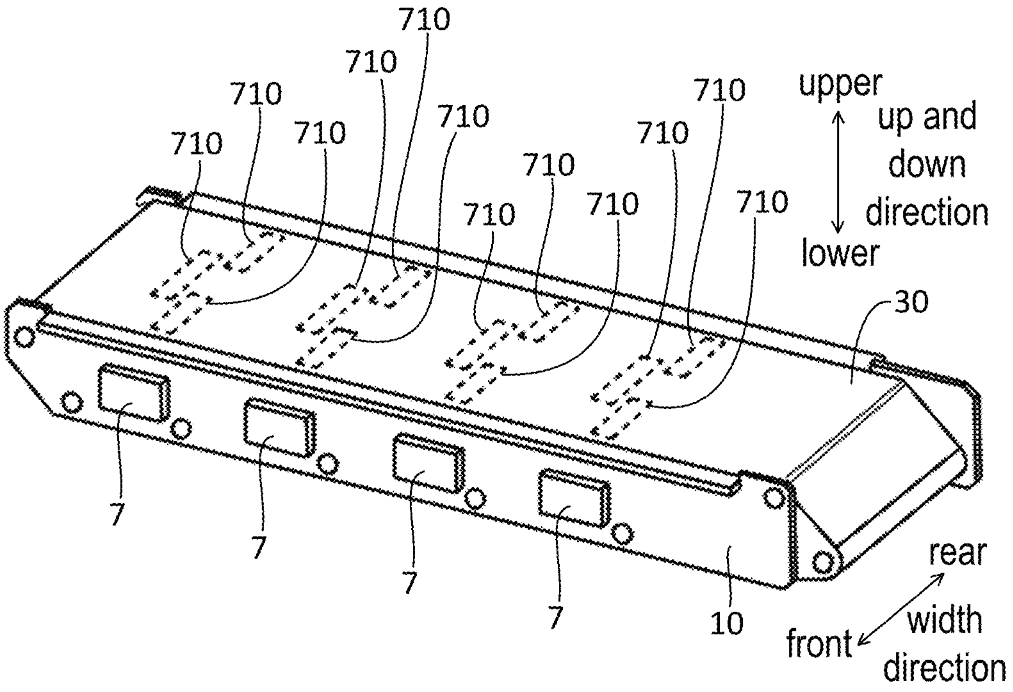
FIG. 6 is a perspective view schematically illustrating the conveyor belt and its vicinity of the ink jet recording device according to the embodiment (in the state where all the waste ink containers are mounted).
Figure 7:
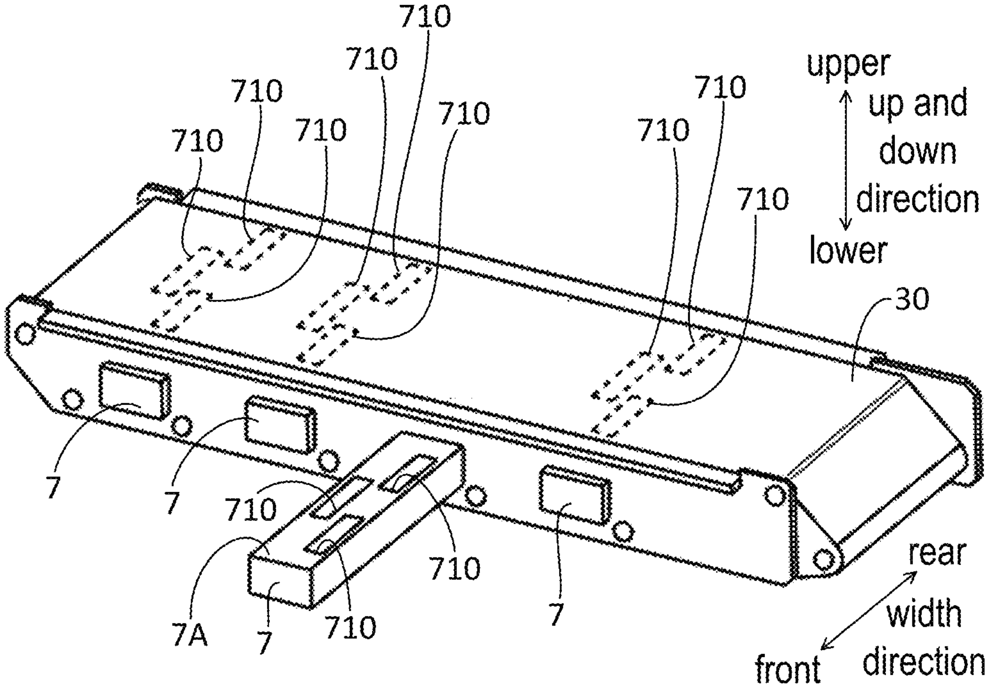
FIG. 7 is a perspective view schematically illustrating the conveyor belt and its vicinity of the ink jet recording device according to the embodiment (in the state where one of the waste ink containers is removed).

The suction mechanism 10 generates a suction airflow. The suction mechanisms 10 are assigned to the waste ink containers 7 one by one. Each suction mechanism 10 is connected to the corresponding waste ink container 7, and sucks the flushing ink from the corresponding record head 40 to the storage area of the waste ink container 7. As the flushing ink is sucked by the function of each suction mechanism 10, it is possible to suppress contamination in the device by the flushing ink. In FIG. 5, the suction directions of the flushing ink are shown by thick black arrows. White arrows show suction directions by the suction units 300.

Note that each waste ink container 7 stores ink to be discarded, such as the flushing ink. The ink to be discarded is ink that is ejected from the record head 40 but is not used for image recording. In other words, each waste ink container 7 stores ink that does not contribute to image recording. In the following description, for convenience sake, ink to be discarded including the flushing ink is referred to as flushing ink as a whole.

<Structure of Waste Ink Container>

Figure 8:
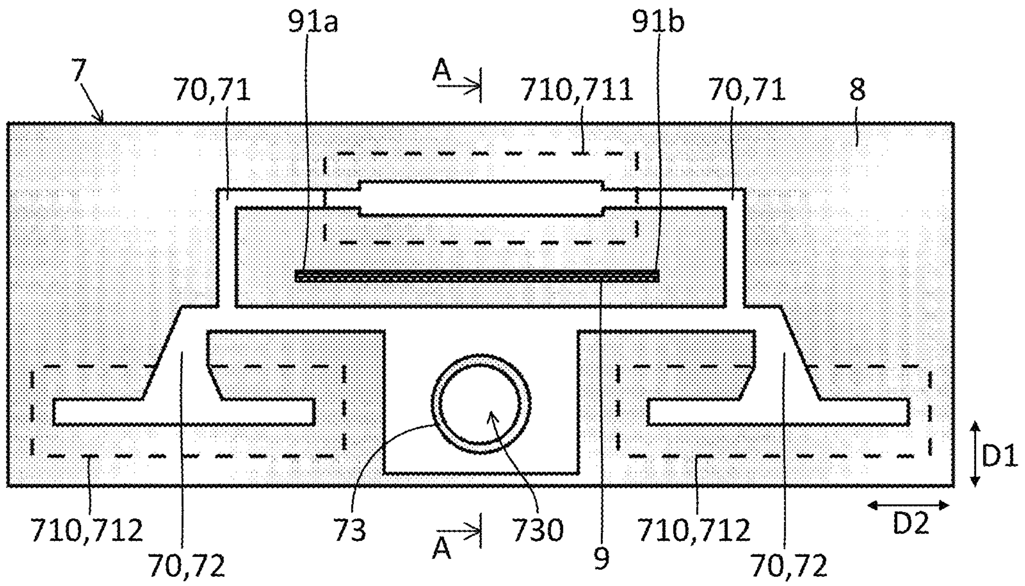
FIG. 8 is a schematic diagram illustrating a storage area of the waste ink container of the ink jet recording device according to the embodiment.

Hereinafter, with reference to FIGS. 8 to 10, one of the waste ink containers 7 is noted, and its structure is described. The individual waste ink containers 7 have the same structure. Therefore, the following description is also applied to structures of other waste ink containers 7, so as to omit descriptions thereof.

Note that a direction parallel to the conveying direction of the sheet S by the conveyor belt 30 corresponds to a "first direction". The width direction of the conveyor belt 30 corresponds to a "second direction". In the following description, for convenience sake, the direction parallel to the conveying direction of the sheet S by the conveyor belt 30 is denoted by D1, and referred to as a first direction D1. The width direction of the conveyor belt 30 is denoted by D2, and referred to as a second direction D2.

The waste ink container 7 has a substantially rectangular parallelepiped shape. The waste ink container 7 is made of metal sheet, for example. The waste ink container 7 has a ceiling part 7A, and a bottom part 7B that faces the ceiling part 7A in the up and down direction. In addition, the waste ink container 7 has a side wall part (not denoted by numeral) that surrounds sides between the ceiling part 7A and the bottom part 7B. The waste ink container 7 has the storage area for the flushing ink, which is an inner area enclosed by the ceiling part 7A, the bottom part 7B, and the side wall part.

The waste ink container 7 includes an absorbing member 8. The absorbing member 8 is disposed in the storage area of the waste ink container 7. The absorbing member 8 is a porous member that absorbs the flushing ink. As material constituting the absorbing member 8, melamine sponge or the like can be used. The absorbing member 8 absorbs the flushing ink and stores the same inside.

Here, the waste ink container 7 includes a suction air duct 70 in the storage area, which transmits the suction airflow generated when the suction mechanism 10 is driven. The suction air duct 70 is formed in a space without the absorbing member 8 in the storage area of the waste ink container 7 (i.e., a gap in the storage area). For instance, the suction air duct 70 is a space obtained by cutting off a part of the absorbing member 8. In other words, the suction air duct 70 is a space surrounded by the absorbing member 8.

The ceiling part 7A works as an ink receiving part that receives the flushing ink sucked by the suction mechanism 10. Specifically, the ceiling part 7A includes a receiving port 710 having a rectangular shape that penetrates in the up and down direction. The receiving port 710 opens upward, and hence the up and down direction may be used to mean an opening direction of the receiving port 710 in the following description.

The receiving ports 710 are assigned to the record heads 40 one by one. In other words, there are three receiving ports 710. Each receiving port 710 faces the corresponding record head 40 in the up and down direction via the conveyor belt 30.

Each receiving port 710 is an opening for collecting the flushing ink ejected from the corresponding record head 40 in the storage area of the waste ink container 7. The flushing ink of each record head 40 passes through the corresponding receiving port 710 and reaches the storage area of the waste ink container 7.

The storage area of the waste ink container 7 is provided with a cylindrical duct 73. The cylinder axis of the duct 73 extends in parallel to the up and down direction. The duct 73 has a suction port 730 that is an opening on one end side in the up and down direction. In other words, the waste ink container 7 has the suction port 730.

Note that the bottom part 7B has a connection port (not denoted by numeral) that penetrates in the up and down direction. The duct 73 extends in a cylindrical shape upward from a rim of the connection port of the bottom part 7B. The suction mechanism 10 is disposed outside the waste ink container 7, and is connected to the connection port of the bottom part 7B. In other words, the suction mechanism 10 is connected to the duct 73. The duct 73 may be a hole formed by boring a part of the absorbing member 8 in the up and down direction, or may be a tube inserted in the hole.

The suction air duct 70 is assigned to each of the three receiving ports 710. In other words, the waste ink container 7 has a plurality of the suction air ducts 70. Each of the plurality of suction air ducts 70 connects the corresponding receiving port 710 and the suction port 730. In FIG. 8, the three receiving ports 710 are shown by broken lines.

Note that one of the three receiving ports 710 is disposed with a space from the suction port 730 in the first direction D1 viewed from the up and down direction. The one receiving port 710 corresponds to a "first receiving port", and in the following description, the one receiving port 710 is referred to as a first receiving port 711. The first receiving port 711 has an aperture shape viewed from the up and down direction, which is a substantially rectangular shape having a longitudinal direction along the second direction D2.

Two receiving ports 710 other than the first receiving port 711 out of the three receiving ports 710 are disposed with a space and the suction port 730 therebetween in the second direction D2 viewed from the up and down direction. The two receiving ports 710 each correspond to a "second receiving port", and in the following description, the two receiving ports 710 are referred to as second receiving ports 712, respectively. Each of the two second receiving ports 712 has an aperture shape viewed from the up and down direction, which is a substantially rectangular shape having a longitudinal direction along the second direction D2.

In addition, the suction air duct 70 connected to the first receiving port 711 corresponds to a "first air duct". In the following description, the suction air duct 70 connected to the first receiving port 711 is referred to as a first air duct 71. One of the suction air ducts 70 connected to one of the second receiving ports 712 and the other suction air duct 70 connected to the other second receiving port 712 each correspond to a "second air duct". In the following description, one of the suction air ducts 70 connected to one of the second receiving ports 712 and the other suction air duct 70 connected to the other second receiving port 712 are each referred to as a second air duct 72.

The two second receiving ports 712 are disposed at symmetric positions with respect to the center of the suction port 730 viewed from the up and down direction. Further, the two second air ducts 72 are formed in symmetric shapes with respect to the center of the suction port 730 viewed from the up and down direction. In other words, the two second air ducts 72 have the same shape. In contrast, the first air duct 71 has a shape different from that of the two second air ducts 72.

In order to equalize suction forces of a plurality of the receiving ports 710, it is necessary to design an appropriate shape of the first air duct 71. Therefore, the shape of the suction air duct 70 viewed from the up and down direction is designed as illustrated in FIG. 8.

Specifically, the first air duct 71 includes one air duct and the other air duct, which are formed to detour the shortest path. The one air duct of the first air duct 71 detours the shortest path viewed from the up and down direction, and extends to one side in the second direction D2 from the first receiving port 711, so as to connect to the suction port 730 at the end. The other air duct of the first air duct 71 detours the shortest path viewed from the up and down direction, and extends to the other side in the second direction D2 from the first receiving port 711, so as to connect to the suction port 730 at the end. Note that the shortest path from the first receiving port 711 to the suction port 730 is a linearly extending path from the first receiving port 711 to the suction port 730 along the first direction D1.

Viewed from the up and down direction, each of the two second air ducts 72 extends from the corresponding second receiving port 712 in the first direction D1 and turns in the second direction D2 to extend and connect to the suction port 730. Note that the second air duct 72 disposed on one side of the suction port 730 in the second direction D2 is partially common to one of the first air ducts 71. The second air duct 72 disposed on the other side of the suction port 730 in the second direction D2 is partially common to the other of the first air ducts 71.

Here, when the suction air duct 70 is designed as the space surrounded by the absorbing member 8 in the storage area of the waste ink container 7, because the absorbing member 8 is a porous member, pores inside the material of the absorbing member 8 can be a suction airflow path. In other words, the suction airflow can pass through a part different from the suction air duct 70 in the storage area of the waste ink container 7. If a large amount of the suction airflow passes through the inside of the absorbing member 8 (i.e., pores in the absorbing member 8), even if the shape of the first air duct 71 is appropriately designed, a difference of suction force between the first receiving port 711 and each second receiving port 712 will increase.

Therefore, the waste ink container 7 further includes a blocking member 9 that blocks the suction airflow path generated inside the absorbing member 8. The blocking member 9 is a member having lower gas permeability than the absorbing member 8. In other words, if comparing between the absorbing member 8 and the blocking member 9 having the same shape, the absorbing member 8 has less resistance against passing air. The blocking member 9 is a plate-like member made of resin. In other words, the blocking member 9 is a member that does not absorb the flushing ink substantially, and is a member that does not transmit the suction airflow.

The material of the blocking member 9 is not limited particularly, and it may be a metal plate member. Note that it is sufficient that the material of the blocking member 9 has lower gas permeability than that of the absorbing member 8. In other words, a porous member may be used as the blocking member 9, as long as it has lower gas permeability than the absorbing member 8.

The blocking member 9 is disposed in the storage area of the waste ink container 7, on a path from the first receiving port 711 to the suction port 730 via the inside of the absorbing member 8 (i.e., pores of the material of the absorbing member 8) without passing through the first air duct 71. In other words, the blocking member 9 is disposed at a position that blocks at least a part of the path from the first receiving port 711 to the suction port 730 via the inside of the absorbing member 8 without passing through the first air duct 71. The blocking member 9 is disposed on the shortest path from the first receiving port 711 to the suction port 730 along the first direction D1. The blocking member 9 is embedded in the absorbing member 8 so as to block the shortest path.

Figure 10:
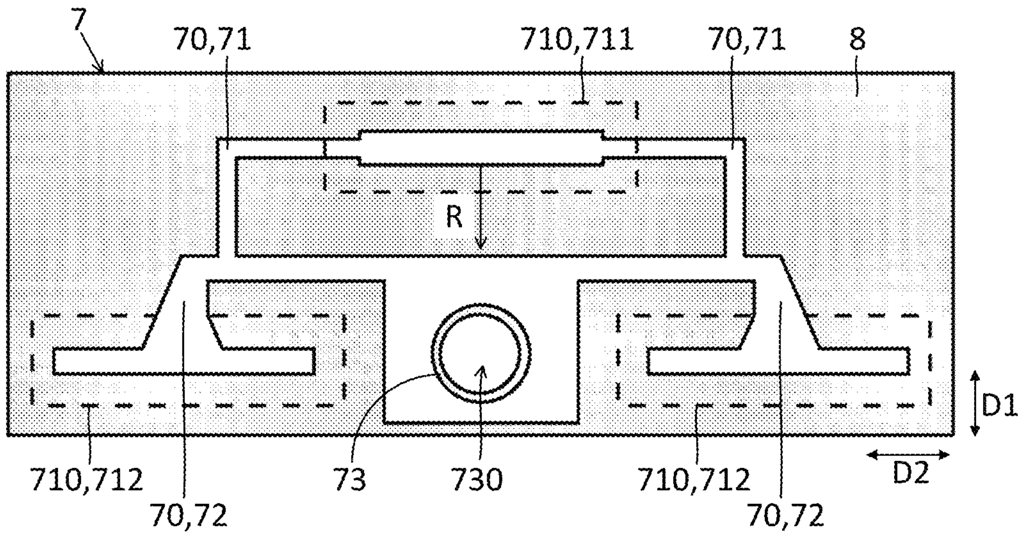
FIG. 10 is a diagram for describing a suction airflow path in the case where a blocking member is eliminated from the waste ink container illustrated in FIG. 8.

If the blocking member 9 is not disposed, as illustrated in FIG. 10, the shortest path from the first receiving port 711 to the suction port 730 along the first direction D1 (shown by an arrow R in FIG. 10) becomes the suction airflow path. In contrast, if the blocking member 9 is disposed, as illustrated in FIG. 8, the shortest path from the first receiving port 711 to the suction port 730 along the first direction D1 is prevented from becoming the suction airflow path.

In the structure of this embodiment, even if a porous member is used as the absorbing member 8, as the blocking member 9 is disposed, a large difference of suction force is hardly generated among the plurality of receiving ports 710. In this way, it is possible to suppress occurrence of variation of the suction force among the plurality of receiving ports 710. In other words, it is possible to suppress insufficient absorption of the flushing ink in a part of the plurality of receiving ports 710. As a result, it is possible to suppress contamination by the flushing ink in the device.

In addition, in this structure, even if a porous member is used as the absorbing member 8, the first air duct 71 and each second air duct 72 have the same (substantially same) pressure loss. In other words, a large difference of suction force hardly occurs among the plurality of receiving ports 710.

Further, by disposing the blocking member 9, it is not required in design of the suction air duct 70 to take it into consideration that the suction airflow passes inside the absorbing member 8. In this way, design of the suction air duct 70 becomes easy.

In addition, by adopting a material of the blocking member 9 that substantially does not absorb the flushing ink, it is easy to prevent the suction airflow from passing inside the absorbing member 8.

Note that the two second air ducts 72 are symmetric with respect to the suction port 730, viewed from the up and down direction, and have the same shape. Therefore, the difference of suction force is small between the second receiving port 712 on one side and the second receiving port 712 on the other side. Therefore, the blocking member 9 is disposed only on the shortest path from the first receiving port 711 to the suction port 730 along the first direction D1. In this way, the number of components (i.e., cost necessary for the blocking member 9) can be reduced.

In addition, the blocking member 9 is disposed so that its thickness direction is perpendicular to the up and down direction. Further, the blocking member 9 is disposed between the first receiving port 711 and the suction port 730 in the first direction D1, viewed from the up and down direction. Further, the blocking member 9 is disposed to extend in the second direction D2 that crosses the first direction D1, viewed from the up and down direction. The angle between the first direction D1 from the first receiving port 711 to the suction port 730 and the second direction D2 in which the blocking member 9 extends is preferably 45 degrees or more, more preferably 60 degrees or more, and most preferably 90 degrees substantially.

Further, viewed from the up and down direction, one side end 91*a* of the blocking member 9 in the second direction D2 is protruded from the one side end of the first receiving port 711 in the one side. In addition, viewed from the up and down direction, the other side end 91*b* of the blocking member 9 in the second direction D2 is protruded from the other side end of the first receiving port 711 in the other side.

In this way, viewed from the up and down direction, the suction airflow is more prevented from passing through a path from the first receiving port 711 to the suction port 730 detouring the position of the blocking member 9. In other words, the suction airflow is more prevented from passing inside the absorbing member 8.

In addition, the blocking member 9 extends in an area including the first air duct 71 in the up and down direction. Further, the blocking member 9 extends from a position higher than an upper end portion of the first air duct 71 to a position lower than a lower end portion of the first air duct 71. In other words, the blocking member 9 has an upper end portion 92*a* higher than the upper end portion of the first air duct 71, and a lower end portion 92*b* lower than the lower end portion of the first air duct 71 (see FIG. 9). The detailed description is as follows.

Figure 9:
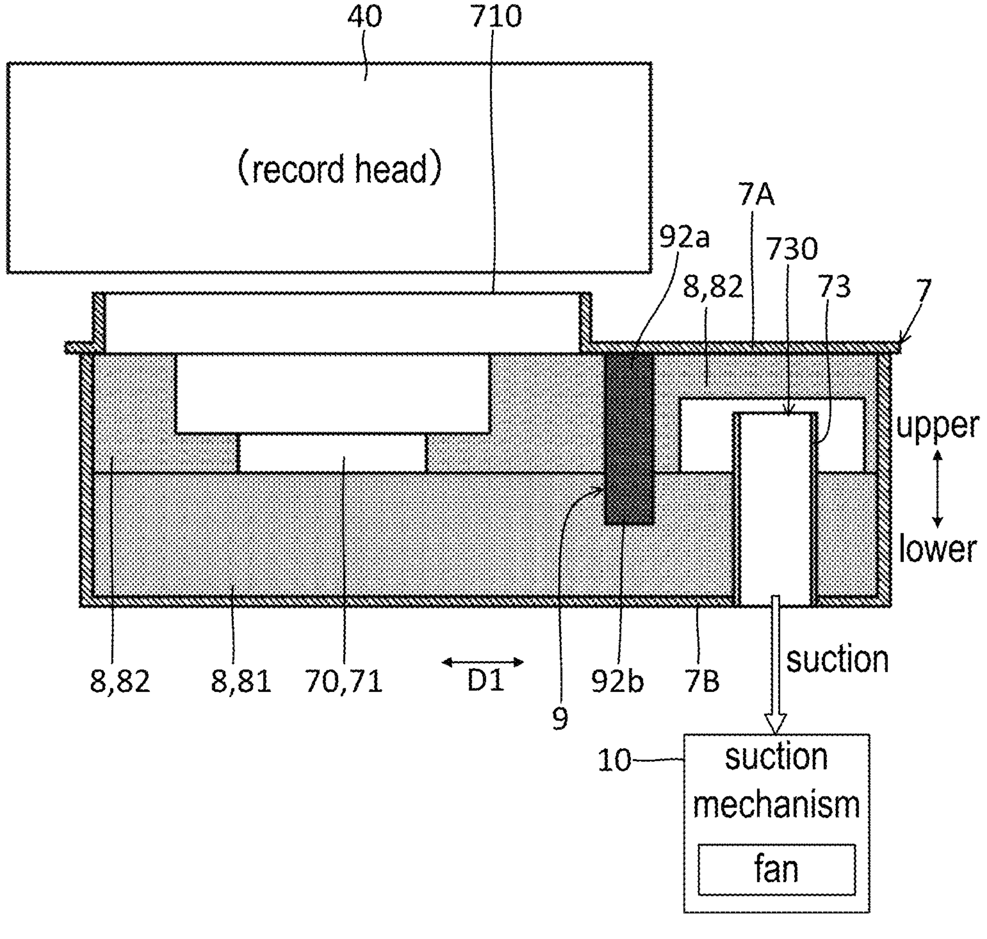
FIG. 9 is a schematic diagram corresponding to a cross section taken along A-A line in FIG. 8.

As illustrated in FIG. 9, the absorbing member 8 includes a lower member 81 that is disposed on a bottom surface of the waste ink container 7 (i.e., the surface facing upward in the storage area), and an upper member 82 disposed on the top of the lower member 81. Further, the suction air duct 70 is formed above the lower member 81. In other words, the suction air duct 70 is formed between the lower member 81 and the upper member 82.

Therefore, the upper end portion 92*a* of the blocking member 9 is positioned inside the upper member 82, and the lower end portion 92*b* of the blocking member 9 is positioned inside the lower member 81. In other words, the blocking member 9 stands from the inside of the lower member 81 upward to reach the upper member 82. In this way, the upper end portion 92*a* of the blocking member 9 is positioned higher than the suction air duct 70 in the up and down direction, and the lower end portion 92*b* of the blocking member 9 is positioned lower than the suction air duct 70 in the up and down direction.

In this way, the suction airflow can be prevented from passing over or under the blocking member 9. In other words, the suction airflow can be more prevented from passing inside the absorbing member 8.

The embodiments disclosed here are merely examples in all respects, and should not be considered as limitations. The scope of the present disclosure is defined not by the above description of the embodiments but by the claims, and further includes all modifications within meanings and ranges equivalent to the claims.

What is claimed is:

1. An ink jet recording device comprising:

a record head that ejects ink so as to record images on a sheet;

a waste ink container that has a storage area inside, so as to store ink that is ejected from the record head and is not used for recording images; and a suction mechanism that sucks gas from the waste ink container, wherein the waste ink container includes a suction port connected to the suction mechanism, a first receiving port that receives ink ejected from the record head, a porous absorbing member disposed in the storage area so as to absorb ink, and a first air duct formed as a space without the absorbing member in the storage area, so as to connect the first receiving port and the suction port, and to transmit suction airflow generated when the suction mechanism is driven, the waste ink container further includes a blocking member having a lower gas permeability than the absorbing member, and the blocking member is disposed on a path from the first receiving port to the suction port via inside the absorbing member without passing through the first air duct.

2. The ink jet recording device according to claim 1, wherein the first receiving port and the suction port are disposed with a space therebetween in a first direction, viewed from an opening direction of the first receiving port, the blocking member is disposed on a shortest path from the first receiving port to the suction port along the first direction, and the first air duct is formed to detour the shortest path.

3. The ink jet recording device according to claim 2, wherein the blocking member is disposed to extend in a second direction crossing the first direction between the first receiving port and the suction port in the first direction, viewed from the opening direction, one side end of the blocking member in the second direction protrudes from one side end of the first receiving port to the one side, viewed from the opening direction, and the other side end of the blocking member in the second direction protrudes from the other side end of the first receiving port to the other side, viewed from the opening direction.

4. The ink jet recording device according to claim 1, wherein the blocking member extends in an area including the first air duct, in an opening direction of the first receiving port.

5. The ink jet recording device according to claim 1, wherein the waste ink container further includes a plurality of second receiving ports that receives the ink ejected from the record head, and a plurality of second air ducts, each of which is formed as a space without the absorbing member in the storage area, and connects each of the plurality of second receiving ports and the suction port, so as to transmit suction airflow generated when the suction mechanism is driven, the first air duct has a shape different from that of the plurality of second air ducts, and the plurality of second air ducts has the same shape.

6. The ink jet recording device according to claim 1, wherein the waste ink container further includes a second receiving port that receives the ink ejected from the record head, and a second air duct formed as a space without the absorbing member in the storage area, so as to connect the second receiving port and the suction port, and to transmit suction airflow generated when the suction mechanism is driven, the first air duct has a shape different from that of the second air duct, and the first air duct has the same pressure loss as the second air duct.

7. The ink jet recording device according to claim 1, wherein the blocking member is a member that does not absorb the ink.

* * * * *